(12) United States Patent
Rebert

(10) Patent No.: US 10,979,595 B2
(45) Date of Patent: *Apr. 13, 2021

(54) SYSTEM AND METHOD FOR SELECTIVELY SENDING, DELIVERY AND RECEIVING OF FAXES

(71) Applicant: OPEN TEXT SA ULC, Halifax (CA)

(72) Inventor: Treber Rebert, Tucson, AZ (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,605

(22) Filed: Apr. 6, 2020

(65) Prior Publication Data

US 2020/0236246 A1 Jul. 23, 2020

Related U.S. Application Data

(63) Continuation of application No. 15/860,220, filed on Jan. 2, 2018, now Pat. No. 10,652,425, which is a
(Continued)

(51) Int. Cl.
*H04N 1/32* (2006.01)
*H04N 1/00* (2006.01)
*H04N 1/21* (2006.01)

(52) U.S. Cl.
CPC ......... *H04N 1/32619* (2013.01); *H04N 1/001* (2013.01); *H04N 1/0001* (2013.01);
(Continued)

(58) Field of Classification Search
CPC ............. H04N 1/32619; H04N 1/0001; H04N 1/00037; H04N 1/0005; H04N 1/00082;
(Continued)

(56) References Cited

U.S. PATENT DOCUMENTS 5,461,488 A 10/1995 Witek
5,644,404 A 7/1997 Hashimoto et al.
(Continued)

FOREIGN PATENT DOCUMENTS

JP 2003319128 11/2003
WO WO0160050 8/2001
(Continued)

OTHER PUBLICATIONS

Office Action issued for U.S. Appl. No. 13/315,978, dated Dec. 16, 2013, 14 pages.
(Continued)

*Primary Examiner* — Neil R McLean
(74) *Attorney, Agent, or Firm* — Sprinkle IP Law Group

(57) ABSTRACT

Embodiment of systems and methods for the sending, delivery or receiving of faxes are disclosed herein. In particular, certain embodiments include a fax connector that may be deployed at users' sites, and a fax registration system that may be deployed remotely from these users' site. The fax connector can be accessed at a user's site over a computer based network in order to perform functions associated with faxing, including sending, receiving and obtaining status on faxes. The fax connector deployed at a sending user's site communicates with the fax registration system to obtain destination data associated with a recipient user's fax connector and transmits the fax to the destination fax connector over the computer based network based on the destination data obtained from the registration system. The fax can then be presented to the recipient at the recipient user's site.

18 Claims, 5 Drawing Sheets

Related U.S. Application Data continuation of application No. 14/612,969, filed on Feb. 3, 2015, now Pat. No. 9,912,833, which is a continuation of application No. 13/485,140, filed on May 31, 2012, now Pat. No. 8,995,025.

(60) Provisional application No. 61/501,549, filed on Jun. 27, 2011.

(52) U.S. Cl.
CPC ....... *H04N 1/0005* (2013.01); *H04N 1/00037* (2013.01); *H04N 1/00082* (2013.01); *H04N 1/00217* (2013.01); *H04N 1/2183* (2013.01); *H04N 1/32411* (2013.01); *H04N 1/32416* (2013.01); *H04N 1/32614* (2013.01); *H04N 1/32683* (2013.01); *H04N 2201/0039* (2013.01); *H04N 2201/0049* (2013.01); *H04N 2201/0093* (2013.01); *H04N 2201/3288* (2013.01)

(58) Field of Classification Search
CPC .. H04N 1/001; H04N 1/2183; H04N 1/00217; H04N 1/32411; H04N 1/32416; H04N 1/32614; H04N 1/32683; H04N 2201/0039; H04N 2201/0049; H04N 2201/0093; H04N 2201/3288
See application file for complete search history.

(56) References Cited

U.S. PATENT DOCUMENTS

| | | | |
|---|---|---|---|
| 5,754,640 A | 5/1998 | Sosnowski | |
| 5,761,284 A | 6/1998 | Ranalli et al. | |
| 5,780,549 A | 7/1998 | Ludwig | |
| 5,862,202 A | 1/1999 | Bashoura et al. | |
| 5,999,601 A | 12/1999 | Wells et al. | |
| 6,020,980 A | 2/2000 | Freeman | |
| 6,058,169 A | 5/2000 | Bramnick et al. | |
| 6,259,538 B1 | 7/2001 | Amit et al. | |
| 6,301,611 B1 | 10/2001 | Matsumoto et al. | |
| 6,310,942 B1 | 10/2001 | Bashoura et al. | |
| 6,512,593 B1 | 1/2003 | Yashiki | |
| 6,539,077 B1 | 3/2003 | Ranalli et al. | |
| 6,603,569 B1 | 8/2003 | Johnson, Jr. et al. | |
| 6,618,165 B1 | 9/2003 | Sehgal | |
| 6,825,947 B1 | 11/2004 | Asai | |
| 6,922,255 B1 | 7/2005 | Tomida | |
| 7,057,752 B1 | 6/2006 | Klotz, Jr. | |
| 7,324,223 B1 | 1/2008 | Mori | |
| 7,480,065 B1 | 1/2009 | Trandal et al. | |
| 7,492,473 B2 | 2/2009 | Ferlitsch et al. | |
| 7,653,185 B2 | 1/2010 | Rebert et al. | |
| 8,249,228 B2 | 8/2012 | Street, Jr. | |
| 8,279,465 B2 | 10/2012 | Couchman | |
| 8,310,710 B2 | 11/2012 | Phillips et al. | |
| 8,493,606 B2 | 7/2013 | Phillips et al. | |
| 8,937,736 B2 | 1/2015 | Rebert et al. | |
| 8,970,880 B2 | 3/2015 | Riedel et al. | |
| 8,970,881 B1 | 3/2015 | Schwarz | |
| 8,995,025 B2 | 3/2015 | Rebert | |
| 9,544,469 B2 | 1/2017 | Rebert et al. | |
| 9,699,127 B2 | 7/2017 | Lennstrom et al. | |
| 9,912,833 B2 | 3/2018 | Rebert | |
| 9,948,826 B2 | 4/2018 | Riedel et al. | |
| 10,097,728 B2 | 10/2018 | Rebert et al. | |
| 10,175,919 B2 | 1/2019 | Schwarz | |
| 10,289,354 B2 | 5/2019 | Schwarz | |
| 10,348,930 B2 | 7/2019 | Riedel et al. | |
| 10,397,155 B2 | 8/2019 | Lennstrom et al. | |
| 10,440,228 B2 | 10/2019 | Rebert et al. | |
| 10,652,425 B2 | 5/2020 | Rebert et al. | |
| 10,728,421 B2 | 7/2020 | Rebert et al. | |
| 10,911,637 B2 | 2/2021 | Rebert et al. | |
| 2001/0005268 A1 | 6/2001 | Eguchi | |
| 2001/0005864 A1 | 6/2001 | Mousseau et al. | |
| 2001/0027478 A1 | 10/2001 | Meier et al. | |
| 2001/0056538 A1 | 12/2001 | Amano | |
| 2002/0018245 A1 | 2/2002 | Saito et al. | |
| 2002/0021791 A1 | 2/2002 | Heilmann et al. | |
| 2002/0026498 A1 | 2/2002 | Kim | |
| 2002/0033961 A1 | 3/2002 | Murphy | |
| 2002/0051146 A1 | 5/2002 | Tanimoto | |
| 2002/0054371 A1 | 5/2002 | Tanimoto | |
| 2002/0073181 A1 | 6/2002 | Christensen | |
| 2002/0157028 A1 | 10/2002 | Koue et al. | |
| 2003/0053444 A1 | 3/2003 | Swartz | |
| 2003/0086124 A1 | 5/2003 | Parry | |
| 2003/0133550 A1 | 7/2003 | Mazor et al. | |
| 2003/0142801 A1 | 7/2003 | Pecht | |
| 2004/0004733 A1 | 1/2004 | Berker et al. | |
| 2004/0039797 A1 | 2/2004 | Simpson et al. | |
| 2004/0136513 A1 | 7/2004 | Chiu | |
| 2004/0218226 A1 | 11/2004 | Antognini et al. | |
| 2005/0086240 A1 | 4/2005 | Richardson et al. | |
| 2005/0086306 A1 | 4/2005 | Lemke | |
| 2005/0094176 A1 | 5/2005 | Matsuishi | |
| 2005/0108323 A1 | 5/2005 | Taylor et al. | |
| 2005/0162706 A1 | 7/2005 | Eguchi et al. | |
| 2005/0168774 A1 | 8/2005 | Eguchi et al. | |
| 2005/0190402 A1 | 9/2005 | Nakamura | |
| 2005/0270558 A1* | 12/2005 | Konsella | H04N 1/00209 358/1.15 |
| 2005/0275871 A1* | 12/2005 | Baird | H04N 1/32411 358/1.15 |
| 2006/0227367 A1 | 10/2006 | Kitada | |
| 2006/0238822 A1 | 10/2006 | Van Hoof | |
| 2007/0130271 A1 | 6/2007 | Ye et al. | |
| 2007/0130365 A1* | 6/2007 | Rebert | H04L 67/12 709/238 |
| 2007/0146802 A1 | 6/2007 | Ushida | |
| 2007/0150242 A1 | 6/2007 | Kitada et al. | |
| 2007/0168557 A1 | 7/2007 | Henry | |
| 2007/0297002 A1 | 12/2007 | Hase et al. | |
| 2008/0019519 A1 | 1/2008 | Su et al. | |
| 2008/0065477 A1 | 3/2008 | Korhonen | |
| 2008/0155108 A1 | 6/2008 | Morris | |
| 2008/0218809 A1 | 9/2008 | Chen et al. | |
| 2008/0252922 A1 | 10/2008 | Ikegami et al. | |
| 2008/0273220 A1 | 11/2008 | Couchman | |
| 2009/0034015 A1 | 2/2009 | Mulligan et al. | |
| 2009/0067414 A1 | 3/2009 | Toscano et al. | |
| 2009/0073499 A1 | 3/2009 | Glunz | |
| 2009/0088191 A1 | 4/2009 | Norton et al. | |
| 2009/0161168 A1 | 6/2009 | Miyamoto | |
| 2009/0190159 A1 | 7/2009 | Toscano et al. | |
| 2009/0222663 A1 | 9/2009 | Chow et al. | |
| 2009/0244617 A1 | 10/2009 | Matsutani | |
| 2009/0316182 A1 | 12/2009 | Lee | |
| 2009/0316203 A1 | 12/2009 | Dukie et al. | |
| 2009/0323100 A1 | 12/2009 | Lee | |
| 2010/0002260 A1 | 1/2010 | Naylor et al. | |
| 2010/0007917 A1 | 1/2010 | Webster et al. | |
| 2010/0039678 A1 | 2/2010 | Noel et al. | |
| 2010/0067063 A1 | 3/2010 | Jang | |
| 2010/0075673 A1 | 3/2010 | Colbert et al. | |
| 2010/0085609 A1 | 4/2010 | Hong | |
| 2010/0182651 A1 | 7/2010 | Rebert et al. | |
| 2010/0097634 A1 | 8/2010 | Meyers et al. | |
| 2010/0208726 A1 | 8/2010 | Oliszewski et al. | |
| 2010/0281016 A1 | 11/2010 | Weissman et al. | |
| 2010/0296121 A1 | 11/2010 | Shaheen, III et al. | |
| 2011/0110366 A1 | 5/2011 | Moore et al. | |
| 2011/0211218 A1 | 9/2011 | Gilmore et al. | |
| 2011/0274258 A1 | 11/2011 | Casalaina et al. | |
| 2012/0143658 A1 | 6/2012 | Toscano et al. | |
| 2012/0147436 A1* | 6/2012 | Nishiyama | H04N 1/32096 358/406 |
| 2012/0257249 A1 | 10/2012 | Natarajan | |
| 2012/0274988 A1 | 11/2012 | Bloomfield | |
| 2012/0297471 A1 | 11/2012 | Smithson | |
| 2013/0088741 A1 | 4/2013 | Murata et al. | |
| 2013/0091042 A1 | 4/2013 | Shah et al. | |

(56) References Cited

U.S. PATENT DOCUMENTS

| | | | |
|---|---|---|---|
| 2013/0287189 | A1 | 10/2013 | Cichielo et al. |
| 2013/0293933 | A1 | 11/2013 | Rebert et al. |
| 2013/0346522 | A1 | 12/2013 | Lennstrom et al. |
| 2014/0204411 | A1 | 7/2014 | Riedel et al. |
| 2014/0307294 | A1 | 10/2014 | Rebert |
| 2014/0340717 | A1 | 11/2014 | Meiyappan |
| 2015/0085324 | A1 | 3/2015 | Rebert et al. |
| 2015/0138601 | A1 | 5/2015 | Riedel et al. |
| 2015/0146256 | A1 | 5/2015 | Schwarz |
| 2015/0181075 | A1 | 6/2015 | Rebert |
| 2017/0070618 | A1 | 3/2017 | Rebert et al. |
| 2017/0264580 | A1 | 9/2017 | Lennstrom et al. |
| 2018/0020121 | A1 | 1/2018 | Riedel et al. |
| 2018/0146112 | A1 | 5/2018 | Rebert et al. |
| 2018/0309904 | A1 | 10/2018 | Rebert et al. |
| 2019/0018626 | A1 | 1/2019 | Schwarz |
| 2019/0394358 | A1 | 12/2019 | Rebert et al. |

FOREIGN PATENT DOCUMENTS

| | | |
|---|---|---|
| WO | WO01060050 | 8/2001 |
| WO | WO03061270 | 7/2003 |

OTHER PUBLICATIONS

Schneider, Introduction to Multi-Tenant Architecture, Developer.com, Feb. 11, 2009, retrieved on Dec. 8, 2010, from <<http:www.developer.com/design/article.php/3801931>>, 4 pages.

Multi-tenant Architecture, Zscaler Cloud Security, 2009-2010, retrieved on Dec. 8, 2010, from <<http://www.zscaler.com/multi-tenant.html>>, 2 pages.

Chong et al., Architecture Strategies for Catching the Long Tail, Microsoft Corporation, Apr. 2006, retrieved on Dec. 8, 2010, from <<http://msdn.microsoft.com/en-us/library/aa479069(printer).aspx>>, 20 pages.

Cloud-based Networking—Why Multi-tenancy Matters, White Paper, Pareto Networks, 2010, 14 pages.

Partial Search Report issued for European Patent Application No. 13 173 845.2, dated Nov. 14, 2013, 5 pages.

Extended Search Report issued for European Patent Application No. 13 173 845.2, dated Mar. 4, 2014, 9 pages.

International Search Report and Written Opinion issued for PCT Application No. PCT/EP2013/059026, completed on Jun. 21, 2013 and dated Jul. 2, 2013, 10 pages.

Office Action issued in U.S. Appl. No. 13/485,140, dated Feb. 24, 2014, 14 pages.

Final Office Action issued for U.S. Appl. No. 13/485,140, dated Aug. 7, 2014, 18 pages.

International Preliminary Report on Patentability (IPRP) issued for PCT Application No. PCT/EP2013/059026, dated Nov. 13, 2014, 7 pages.

Office Action issued for U.S. Appl. No. 14/606,519, dated Mar. 9, 2015, 15 pages.

Office Action issued for U.S. Appl. No. 14/606,523, dated Mar. 11, 2015, 11 pages.

Office Action issued for U.S. Appl. No. 14/556,958, dated Mar. 30, 2015, 8 pages.

Office Action issued for U.S. Appl. No. 13/927,023, dated Apr. 7, 2015, 16 pages.

Office Action issued for U.S. Appl. No. 14/606,519, dated Sep. 8, 2015, 14 pages.

Office Action issued for U.S. Appl. No. 13/927,023, dated Sep. 23, 2015, 20 pages.

Office Action issued for U.S. Appl. No. 14/800,350, dated Sep. 10, 2015, 8 pages.

Office Action issued for U.S. Appl. No. 14/606,523, dated Oct. 19, 2015, 18 pages.

Final Office Action issued for U.S. Appl. No. 14/606,519, dated Dec. 17, 2015, 14 pages.

Office Action issued for U.S. Appl. No. 13/927,023, dated Feb. 9, 2016, 21 pages.

Office Action issued for U.S. Appl. No. 14/612,969, dated Feb. 29, 2016, 16 pages.

Notice of Allowance issued for U.S. Appl. No. 14/606,523, dated Apr. 8, 2016, 15 pages.

Office Action for U.S. Appl. No. 14/606,519, dated May 3, 2016, 14 pgs.

Notice of Allowance issued for U.S. Appl. No. 14/606,523, dated Jul. 15, 2016, 6 pages.

Office Action issued for U.S. Appl. No. 14/612,969, dated Aug. 2, 2016, 19 pages.

Office Action issued for U.S. Appl. No. 14/606,519, dated Oct. 12, 2016, 15 pages.

Office Action issued for U.S. Appl. No. 14/612,969, dated Feb. 7, 2017, 16 pages.

Office Action issued for U.S. Appl. No. 14/606,523, dated Feb. 28, 2017, 19 pages.

Office Action issued for U.S. Appl. No. 15/356,078, dated Feb. 24, 2017, 10 pages.

Office Action issued for U.S. Appl. No. 14/612,969, dated May 30, 2017, 15 pages.

Office Action issued for U.S. Appl. No. 14/606,523, dated Jun. 19, 2017, 25 pages.

Office Action issued for U.S. Appl. No. 15/356,078, dated Jun. 2, 2017, 6 pages.

Office Action issued for U.S. Appl. No. 15/609,843, dated Jul. 12, 2017, 25 pages.

Office Action issued for U.S. Appl. No. 15/356,078, dated Oct. 2, 2017, 6 pages.

Office Action issued for European Patent Application No. 13 173 845.2, dated May 31, 2017, 8 pages.

Office Action issued for U.S. Appl. No. 14/606,523, dated Nov. 6, 2017, 34 pages.

Office Action issued for U.S. Appl. No. 15/609,843, dated Jan. 9, 2018, 18 pages.

Office Action issued for U.S. Appl. No. 14/606,523, dated Mar. 29, 2018, 40 pages.

Office Action issued for U.S. Appl. No. 15/609,843, dated May 10, 2018, 15 pages.

Summons to Attend Oral Proceedings issued for European Patent Application No. 13173845.2, dated Feb. 5, 2018, 8 pages.

Office Action issued for U.S. Appl. No. 15/609,843, dated Dec. 10, 2018, 17 pages.

Office Action issued for U.S. Appl. No. 15/860,220, dated Apr. 16, 2019, 18 pages.

Office Action issued for U.S. Appl. No. 15/860,220, dated Sep. 4, 2019, 21 pages.

Office Action issued for U.S. Appl No. 16/555,906, dated Oct. 3, 2019, 13 pages.

Notice of Allowance issued for U.S. Appl. No. 15/860,220, dated Jan. 7, 2020, 14 pages.

Notice of Allowance issued for U.S. Appl. No. 16/555,906, dated Mar. 13, 2020, 14 pages.

Notice of Allowance issued for U.S. Appl. No. 16/900,456, dated Sep. 28, 2020, 14 pages.

* cited by examiner

SYSTEM AND METHOD FOR SELECTIVELY SENDING, DELIVERY AND RECEIVING OF FAXES

CROSS-REFERENCE TO RELATED APPLICATIONS

This patent application is a continuation of, and claims a benefit of priority under 35 U.S.C. § 120 from U.S. patent application Ser. No. 15/860,220, filed Jan. 2, 2018, entitled "SYSTEM AND METHOD FOR SELECTIVELY SENDING, DELIVERY AND RECEIVING OF FAXES" now U.S. Pat. No. 10,652,425, by inventor Treber Rebert, which is a continuation of, and claims a benefit of priority under 35 U.S.C. § 120 from U.S. patent application Ser. No. 14/612,969, filed Feb. 3, 2015, now U.S. Pat. No. 9,912,833, entitled "SYSTEM AND METHOD FOR SELECTIVE SENDING, DELIVERY OR RECEIVING OF FAXES THROUGH COMPUTER BASED NETWORKS BASED ON A DESTINATION ON A PUBLICLY SWITCHED TELEPHONE NETWORK" by inventor Treber Rebert, which is a continuation of, and claims a benefit of priority under 35 U.S.C. § 120 from U.S. patent application Ser. No. 13/485,140, filed May 31, 2012, now U.S. Pat. No. 8,995,025, entitled "SYSTEM AND METHOD FOR SENDING, DELIVERY AND RECEIVING OF FAXES THROUGH COMPUTER BASED NETWORKS WITH A PUBLICLY SWITCHED TELEPHONE NETWORK AS A BACKUP" by inventor Treber Rebert, which claims the benefit of priority under 35 U.S.C. 119(e) of U.S. Provisional Patent Application Ser. No. 61/501,549, filed Jun. 27, 2011, entitled "SYSTEM, METHOD AND COMPUTER PROGRAM PRODUCT FOR PEER-TO-PEER (P2P) OPTIMAL FAX DELIVERY," by inventor Treber Rebert, the entire contents of which are hereby expressly incorporated by reference for all purposes.

TECHNICAL FIELD

This disclosure relates generally to digital content delivery in a network environment. More particularly, this disclosure relates to the transmission, delivery or reception of data through computer based networks or telephone networks. Even more specifically, this disclosure relates to the transmission, delivery or reception of faxes through computer based networks or telephone networks.

BACKGROUND

Entities such as consumers, organizations, enterprises, governments, etc. need to exchange data for a variety of reasons, as may be easily imagined. In the modern world, this data exchange is often times accomplished electronically using a variety of methodologies. These methodologies include, for example, local storage (e.g. a thumb driver holding the data which can be physically delivered to a recipient), file transfer using particular protocols (e.g. file transfer protocol (FTP)), sending an email with an attachment, facsimile (fax), etc.

While all these methods serve the same end, each of these methodologies has differing capabilities with respect to various characteristics such as ease of use, speed, security (e.g. the ability to resist interception or tampering), traceability, cost, etc. For example, using local storage may not feasible if two entities are widely dispersed geographically, while email attachments may not be secure enough to address some entities' concerns.

Faxing, while still heavily utilized by individuals and the workflows of various enterprises, may also present some difficulties. A fax comprises a document in a digital image format. The document is associated with a destination specified with respect to a publicly switched telephone network (PSTN). Thus, typically for at least a portion of the transmission, the document is transmitted over the PSTN. Faxing provides a secure, traceable and non-repudiable mechanism for content delivery and can be particularly useful in business environments.

Faxing, however, has limitations. For example, conventional fax machines can only transmit black and white files with limited resolution in a specific format such as the Tagged Image File Format (TIFF). Further, the transmission speed over the PSTN can be very slow compared to today's computer based networks. Additionally, as faxing may use the PSTN, faxing between two entities that are in different geographic area may require an expensive phone call. Accordingly, traditional faxing may be expensive as well as slow.

Thus, what is desired is a way of exchanging data in manner that is easy to use, relatively fast, secure and cost effective and yet still may be compatible with previous methods for data exchange, especially those that that may have been utilized in various workflows, such as faxing, etc.

SUMMARY

To address these needs, among others, embodiments of systems and methods for the sending, delivery and receiving of faxes are disclosed herein. In particular, systems and methods for the sending, delivery or receiving of faxes are disclosed herein. In particular, certain embodiments include a fax connector that may be deployed at users' sites, and a fax registration system that may be deployed remotely from these users' site. The fax connector can be accessed at a user's site over a computer based network in order to perform functions associated with faxing, including sending, receiving and obtaining status on faxes. The fax connector deployed at a sending user's site communicates with the fax registration system to obtain destination data associated with a recipient user's fax connector and transmits the fax to the destination fax connector over the computer based network based on the destination data obtained from the registration system. The fax can then be presented to the recipient at the recipient user's site.

Furthermore, in some embodiments, the fax may be transmitted over the publicly switched telephone network (PSTN), instead of, or in addition to, transmission over the computer based network. By transmitting over the PSTN, delivery to a recipient may still occur for example, in cases of an error occurring with respect to transmission over the computer based network, when the sender lacks authorization to send over the computer based network, when the specified destination phone number is not found, or in other instances.

Accordingly, using embodiments of the systems and methods presented herein faxing may be achieved in a manner that is easy to use, fast, secure, reliable and cost effective and yet that is still compatible with previous methods for data exchange. More specifically, because in most cases fax users already perform faxing utilizing fax servers, fax appliances, fax software, etc. connected to a computer based network (e.g. an IP (or other protocol) based network for communication between computing devices), faxing can be accomplished using embodiments of the systems and methods presented herein substantially without deviation from the user's previous faxing methodologies or workflows. Moreover, the speed of such faxes may be increased and the cost of such faxes reduced, as they may be transmitted over the computer based network.

Additionally, security of fax transmissions may be increased by verifying fax numbers or other destination data using the registration system and encrypting at least portions of the transmissions over the computer based network. Traceability may be implemented through the use of reporting features provided by embodiments of fax connectors as disclosed herein and reliability may be achieved by utilizing the PSTN as a backup transmission mechanism.

In one embodiment, a request to send a fax may be received at a sending fax system, wherein the fax is associated with a destination on a PSTN such as a telephone number. A location on a computer based network associated with the destination on the PSTN may be determined by sending a request for the location associated with the destination on the PSTN to a fax registration system and receiving the location associated with the destination on the PSTN at the sending fax system. The fax can then be transmitted from the sending fax system to the location over the computer based network.

In some embodiments, it can be determined if an error occurred during while transmitting the fax and if an error occurred, the fax can be sent to the destination on the PSTN over the PSTN.

In other embodiments, it can be determined if the destination on the PSTN is one of a first set of registered destinations at the sending fax system, where the first set of registered destinations at the sending fax system were previously synchronized with a second set of registered destinations at the fax registration system.

In certain embodiment, the fax registration system and the location on the computer based network may be on a cloud based computing platform.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
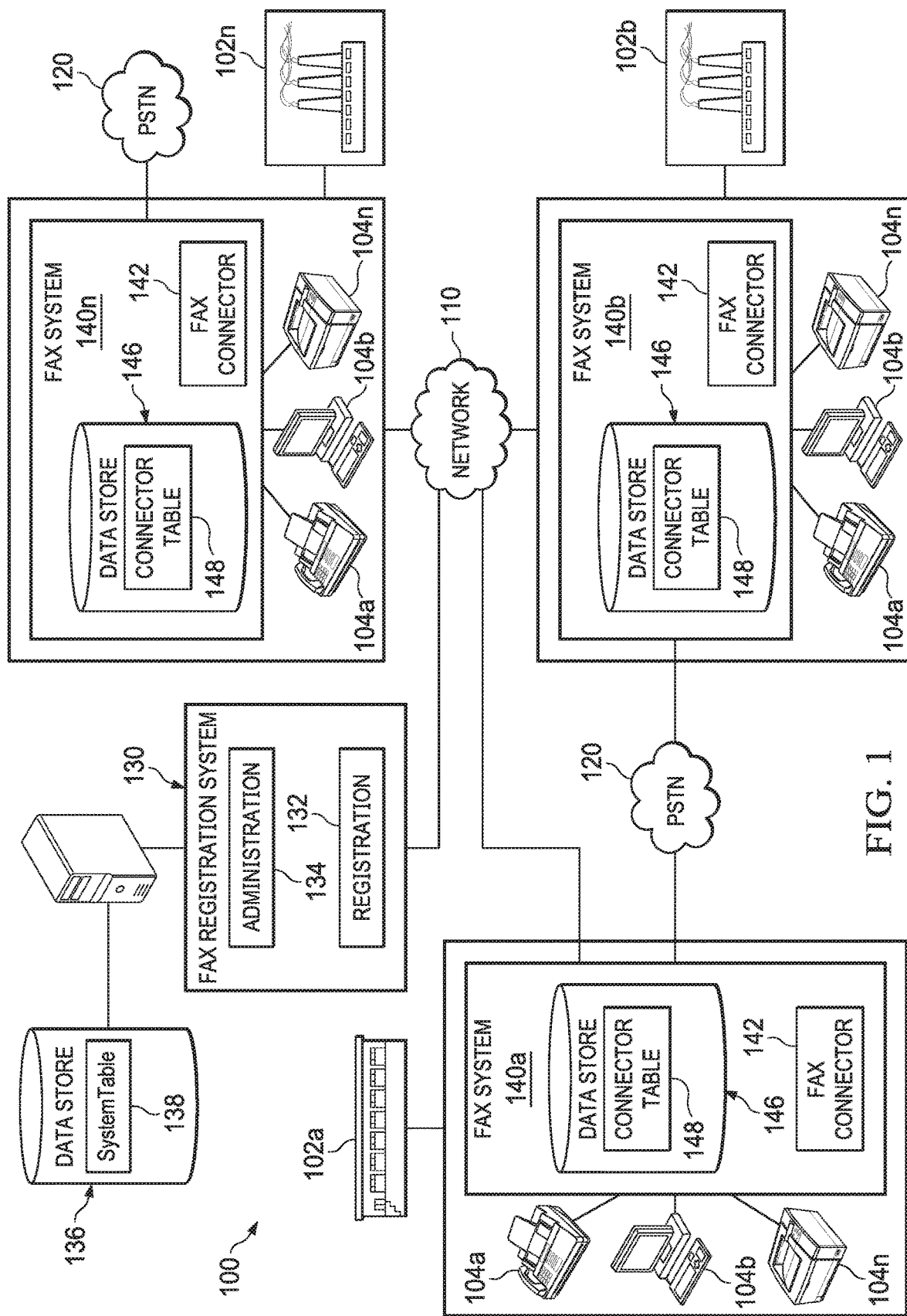
FIG. 1 depicts one embodiment of an architecture for a faxing system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one HD, and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc.

Before discussing specific embodiments, a brief overview of the context of the disclosure may be helpful. As discussed above, what is desired is a way of exchanging data in manner that is easy to use, fast, secure, reliable and cost effective and yet that is still compatible with previous methods for data exchange, especially those that that may have been utilized in various workflows, such as faxing, etc.

To that end, attention is now directed toward the embodiments of systems and methods for the sending, delivery or receiving of faxes disclosed herein. In particular, certain embodiments include a fax connector that may be deployed at users' sites, and a fax registration system that may be deployed remotely from these users' site. The fax connector can be accessed at a user's site over a computer based network in order to perform functions associated with faxing, including sending, receiving and obtaining status on faxes. The fax connector deployed at a sending user's site communicates with the fax registration system to obtain destination data associated with a recipient user's fax connector and transmits the fax to the destination fax connector over the computer based network based on the destination data obtained from the registration system. The fax can then be presented to the recipient at the recipient user's site.

Furthermore, in some embodiments, the fax may be transmitted over the PSTN, instead of, or in addition to, transmission over the computer based network. By transmitting over the PSTN, delivery to a recipient may still occur for example, in cases of an error occurring with respect to transmission over the computer based network, when the sender lacks authorization to send over the computer based network, when the specified destination phone number is not found, or in other instances.

Accordingly, using embodiments of the systems and methods presented herein, faxing may be achieved in a manner that is easy to use, fast, secure, reliable and cost effective and yet that is still compatible with previous methods for data exchange. More specifically, because in most cases fax users already perform faxing utilizing fax servers, fax appliances, fax software, etc. connected to a computer based network (e.g. an IP (or other protocol) based network for communication between computing devices), faxing can be accomplished using embodiments of the systems and methods presented herein substantially without deviation from the user's previous faxing methodologies or workflows. Moreover, the speed of such faxes may be increased and the cost of such faxes reduced, as they may be transmitted over the computer based network.

Additionally, security of fax transmissions may be increased by verifying fax numbers or other destination data using the registration system and encrypting at least portions of the transmissions over the computer based network. Traceability may be implemented through the use of reporting features provided by embodiments of fax connectors as disclosed herein and reliability may be achieved by utilizing the PSTN as a backup transmission mechanism.

Turning now to FIG. 1, one embodiment of an architecture of just such a faxing system is depicted. Fax architecture 100 includes fax systems 140 and fax registration system 130 communicating over a computer based network ("network") 110 which may be, for example, the Internet, an internet, an intranet, a LAN, a WAN, an IP based network, etc.

Fax system 140 is installed at a site where users wish to send or receive faxes. Fax system 140 may include a fax server such as the RightFax Enterprise Edition fax server or the like. Users 102 in such an architecture 100 may be companies, individual users, or any other entity wishing to send or receive faxes. Accordingly, fax system 140 may be one or more computing devices or one or more computer processes executing on one or more computer devices utilized by such users 102 to send or receive faxes. Fax system 140 provides an interface such as an API, hardware interface, etc. through which a fax to send may be received from a client 104 of the fax system 140. These clients 104 may include a fax machine, a printer, an enterprise resource planning (ERP) system, etc.

Fax system 140 may include one or more interfaces to PSTN 120 and be configured to send or receive faxes over the PSTN 120. Additionally, fax system 140 includes fax connector 142 for transmitting faxes received from clients 104 over network 110 and receiving faxes transmitted over network 110. Fax system 140 may communicate with fax registration system 130 over network 110 to facilitate transmission of these faxes.

Fax registration system 130 includes a registration module 132 and an administration module 134. Administration module 134 is configured to provide an interface by which users who wish to receive faxes at their site may provide destination data. Such destination data may include, for example, a destination on the PSTN (e.g. a telephone number) associated with their fax system 140 or a location on network 110 associated with their fax system 140 (for example, a universal resource locator (URL), a universal resource indicator, an internet protocol (IP) address, etc.). This destination data may be stored in registration system table 138 in data store 136. Thus the registration system table 138 may comprise a set of registered destinations and associated destination data. Administration module 134 may also present an interface by which users of registration system 130 may obtain or view statistics on faxes sent or received at an associated fax system such as data usage, status on delivery, etc.

Registration module 132 may provide an interface by which such destination data may be obtained. More specifically, this interface may be configured such that a synchronization request may be received. In response to such a synchronization request, registration module 132 may return a list of the destinations on the PSTN associated with fax systems 140 that are stored in registration system table 138.

The interface of registration module 132 may also be configured to receive a request for destination data associated with a particular destination on the PSTN 120. In response to such a request for destination data, the registration module 132 may return a location on the network 110 associated with the destination on the PSTN 120 if the destination on the PSTN 120 is in registration system table 138.

Accordingly, at various intervals (e.g. hourly, daily weekly, etc.) fax connector 142 may send a synchronization request to registration module 132 of the fax registration system 130 and receive a list of registered destinations on the PSTN 120 in response to the request. Fax connector 142 may store the received registered destinations on the PSTN 120 in connector table 148 in data store 146.

When a user 102 in architecture 100 wishes to send a fax he may utilize a client 104 at the user's site to send the fax. Client 104 provides the fax to the fax system 140. Fax system 140 may therefore receive a fax intended for a destination on the PSTN. The fax system 140 may check the connector table 148 to determine if the destination on the PSTN 120 associated with the received fax is a registered destination in the connector table 148. If it is not, the fax may be transmitted to the destination over the PSTN 120.

If, however, the destination on the PSTN 120 is a registered destination in the connector table 148, fax connector 142 may request destination data associated with the destination on the PSTN from registration module 132 of the fax registration system 130. In response, fax connector 142 may receive destination data associated with the destination on the PSTN 120, including a location on network 110 associated with the destination on the PSTN 120.

Fax connector 142 may then transmit the fax over the network 110 to that location on the network 110. If there is an error in the transmission or the transmission is otherwise unsuccessful, the fax may be sent over the PSTN 120 to the original destination on the PSTN 120 provided by the user. If the transmission is successful, the fax connector 142 associated with the location on the network 110 may receive the fax and deliver or otherwise present the fax to a user 102.

It will be observed by astute readers that in order to receive a fax over network 110, the location on network 110 associated with the receiving fax system 140 may need to be a publicly accessible location on the network (e.g. not behind a firewall or the like). In many cases, however, for a variety of reasons, users 102 may be reluctant to deploy portions of their software or site publicly (e.g. outside of a firewall utilized at the user's site).

Figure 2:
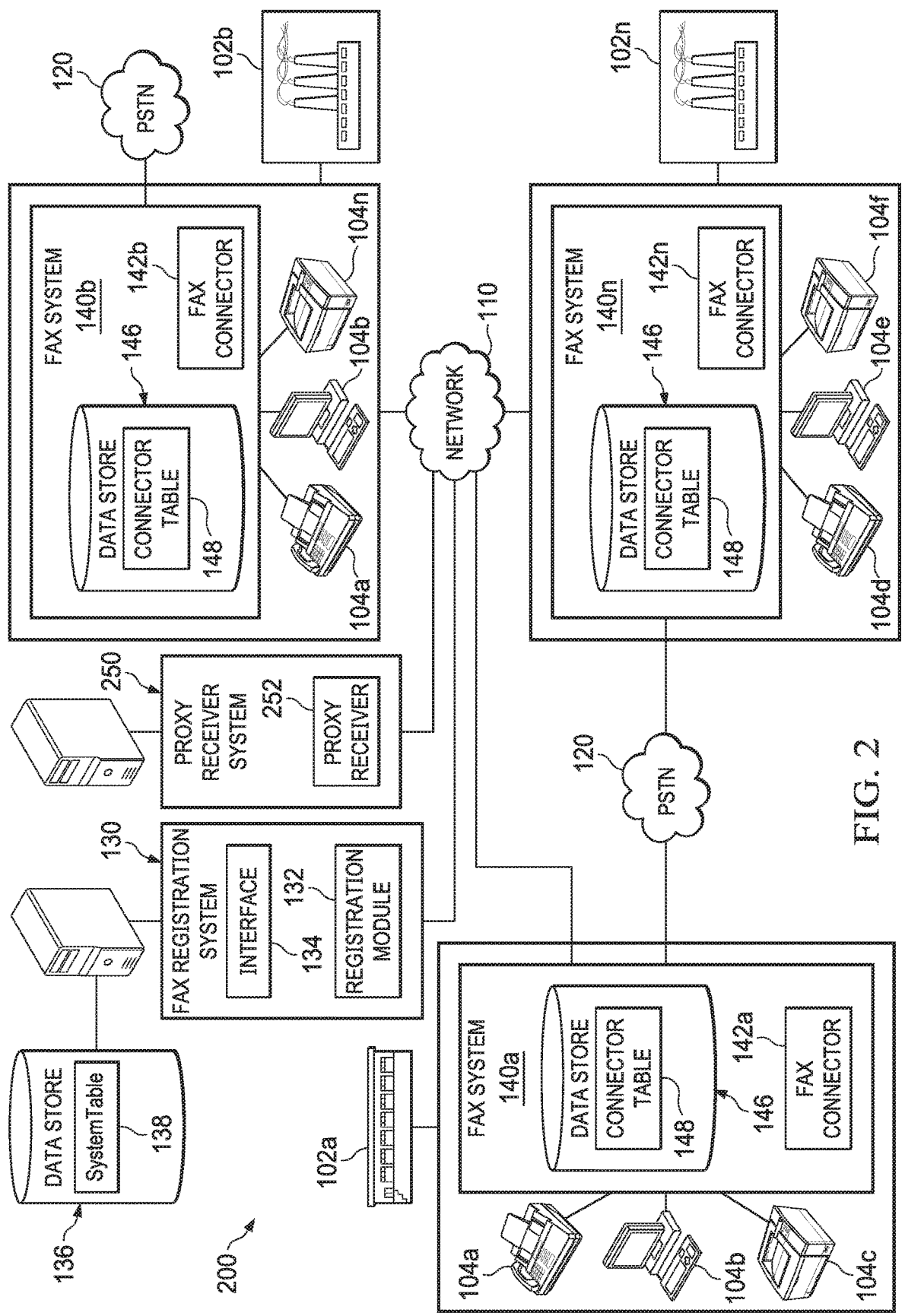
FIG. 2 depicts one embodiment of an architecture for a faxing system.

Accordingly, in some embodiments, it may be desirable to provide a location associated with the receiving fax system 140 remotely from a user's site. With that in mind, reference is now made to FIG. 2 where an embodiment of an architecture of a faxing system including a proxy receiving system is depicted. It will be noted that certain components as depicted in FIG. 2 function substantially the same as described above and thus will not be elaborated on here in more detail.

Here, architecture 200 includes fax systems 140, fax connector 142 and proxy receiver system 250. Proxy receiver system 250 may include proxy receiver module 252 operating as a proxy for the location on network 110 associated with fax system 140 or fax receiver 142. The proxy receiver module 252 may include an association between each location on the network it provides and a fax connector 142. The proxy receiver module 252 may be configured to transmit a fax or other communication received for a particular location on the network 110 to the fax connector 142 associated with that location on the network 110.

Thus, when a user 102 in architecture 200 wishes to send a fax, he may utilize a client 104 at the user's site to send the fax. Client 104 provides the fax to the fax system 140 through the interface provided by the fax system 140. Fax system 140 may therefore receive a fax intended for a destination on the PSTN. The fax system 140 may check the connector table 148 in the data store 146 to determine if the destination on the PSTN 120 associated with the received fax is in the connector table 148. If it is not, the fax may be transmitted to the destination over the PSTN 120.

If, however, the destination on the PSTN 120 is in the connector table 148, fax connector 142 may request destination data associated with the destination on the PSTN from registration module 132 of the fax registration system 130. In response, fax connector 142 may receive destination data associated with the destination on the PSTN 120, where the received destination data includes the location on network 110 associated with destination on the PSTN 120.

Fax connector 142 may then transmit the fax over the network 110 to the location on the network 110. As the location on the network is being provided by proxy receiver module 252 the fax may be received at proxy receiver module 252. The fax connector 142 associated with that location on the network 110 may be determined by the proxy receiver module 252 and the fax may then be forwarded from the proxy receiver module 252 to the fax connector 142 associated with the location on network 110 being provided by proxy server module 252. Here, because the publicly available location on network 110 is being provided by proxy receiver system 250 which may be at a remote location and operated by another entity, users' security concerns may be assuaged.

While it should be understood from a review of the above description that embodiments as disclosed may be implemented using a wide variety of architectures and hardware or software systems; that a fax registration system and a proxy receiver system may be one or multiple systems that may or may not be distributed; that all of the modules (including the fax connectors, interface module, administration module, registration module and proxy receiver module) presented herein may or may not be one or multiple services (e.g. web services or the like) with one or more interfaces; and that these one or more services may be implemented and accessed in a variety of manners, it will be useful here to describe a particular embodiment in more detail.

As discussed above, in some cases it is desirable to have a registration system or a proxy receiver system remote from a user's site. However, embodiments of the systems and methods disclosed herein may have many users and thus may entail the registration of many locations on the PSTN, a large amount of destination data, or the provisioning of a large number of locations on the network. Additionally, as users of the registration system and the proxy receiver systems may be geographically distributed it is desirable to maximize user's access to the fax registration system and the proxy receiver system to reduce downtime and allow substantially simultaneous access from multiple users to these systems.

Therefore, in one embodiment, an entity implementing embodiments of the systems and method disclosed herein may implement modules associated with a fax registration system or a proxy receiver system in a cloud based computing environment by deploying services associated with these systems using a cloud based service provider, such as Microsoft Windows Azure, Amazon EC2, vMware vCloud, Google's cloud, etc. By deploying the modules of the fax registration system or the proxy receiver system in the cloud as services, such services can utilize the storage and other functionality provided by the cloud provider while achieving increased accessibility and reliability. In addition, in certain embodiments, when a proxy receiver system is deployed in a cloud based computing environment the security of users sites is simultaneously increased by alleviating these users from the need to provide publicly available locations on a network.

Figure 3:
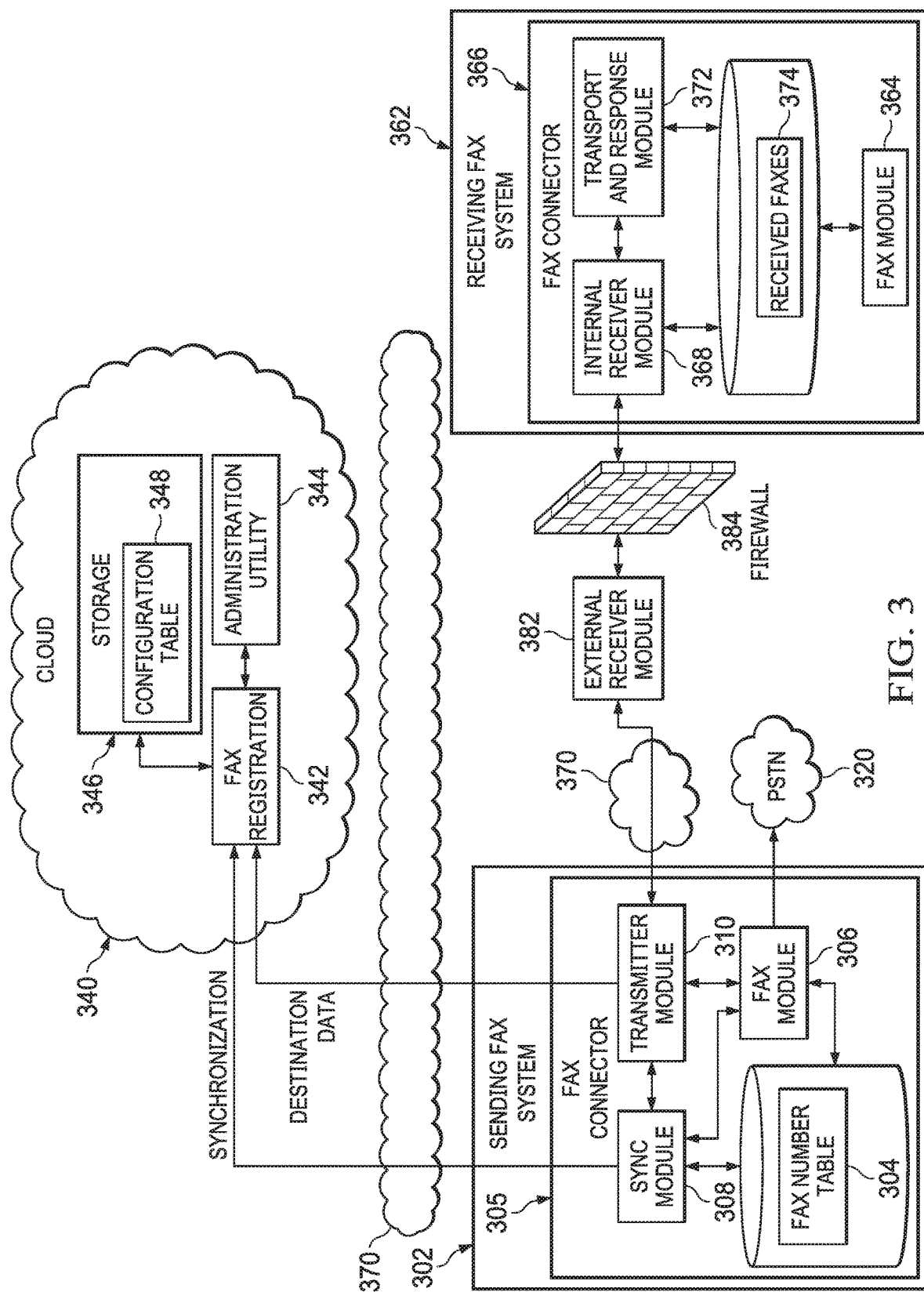
FIG. 3 depicts one embodiment of an architecture for a faxing system.

With that in mind, turning now to FIG. 3, one embodiment of an architecture of a faxing system where services associated with a fax registration system are deployed in a cloud based computing environment is depicted. Fax architecture 300 includes a network 370 over which a sending fax system 302, a receiving fax system 362 and fax registration module 342 deployed in cloud 340 may communicate.

Fax connector 305 is provided at sending fax system 302 and may have an associated identifier (i.e. the fax connector identifier). Fax connector 305 at the sending fax system 302 may comprise fax module 306, sync module 308 and transmitter module 310. Fax module 306 is coupled to PSTN 320 and is configured to transmit faxes to a destination on PSTN over the PSTN 320. Fax module 306 provides an interface through which a client of the fax connector 305 may send faxes or check the status on sent faxes. The fax module 306 is thus configured to receive a fax and an associated destination on the PSTN 320; determine if a destination on the PSTN 320 is a registered destination in the fax number table 304; provide a fax and a destination on the PSTN to the transmitter module 310; receive a status from transmitter module 310 and transmit a fax to a destination on the PSTN 320.

Sync module 308 is configured to send a request for a set of registered destinations on the PSTN; receive a set of registered destinations on the PSTN; and store a received set of registered destinations on the PSTN in fax number table 304. Transmitter module 310 is configured to receive a fax and a destination on the PSTN; send a request for destination data associated with a destination on the PSTN; transmit a fax to a location on the network 370; request a status; receive a status on a transmission or fax; and provide a status to fax module 306.

Receiving fax system 362 includes fax connector 366 and may provide an external receiver module 382 that is at a location that is accessible over network 370 and which may, for example, by outside of a firewall 384. External receiver module 382 is configured to receive requests for faxes; receive transmissions associated with faxes; provide a transmission to an associated internal receiver module 368; receive a status or checksum; provide a status or checksum to a sending fax connector; receive a request for status; and provide a status to a sending fax connector.

Internal receiver module 368 is configured to provide the fax to transport and response module 372; receive an acknowledgement from transport and response module 372 and respond to a request for a status. Transport and response module 372 is configured to store the fax in received faxes storage 374; determine that the fax has been delivered; and provide an acknowledgement to internal receiver module 368. Fax module 364 is configured to retrieve a received faxes from received faxes storage 374 and deliver a fax to a client of the receiving fax system 362 based on associated destination information.

Cloud 340 is a cloud based computing platform such as Microsoft Windows Azure Platform or the like. The faxing registration services deployed in the cloud include fax registration service 342 and an administration utility service 344. These services may have one or more interfaces that may be accessed over network 370 using a web services interface based on hypertext transfer protocol (http), or other types of network protocols or interfaces. Other services provided by the cloud 340 (not depicted) may also be utilized (e.g. in the case of Microsoft Windows Azure Platform: Web Role, Worker Role, VM Role, Access Control, Content Delivery Network, Caching, etc. Other services in other cloud based computing platforms may also be utilized).

The cloud 340 may provide certain services that may be utilized by the deployed fax registration services, including for example the Microsoft Windows Azure Storage services such as table storage, queue storage blob storage, etc. This storage may be used during operation of the deployed service and may store various configuration information associated with the services.

The administration utility module 344 is configured to provide an interface by which a user may register a destination on the PSTN and provide destination data associated with a registered destination on the PSTN or otherwise manage an account related to fax registration service. The administration utility service 344 may store the destination data in configuration table 348 in storage 346 provided by cloud 340.

Fax registration service 342 is configured to receive a request for destination data associated with a destination on the PSTN; respond to such a request with destination data; receive a synchronization request; and respond to the synchronization request with a set of destinations on the PSTN. As can be seen then, the fax connector 306 at the sending fax system 302, the fax connector 366 at the receiving fax system and the fax registration service 342 deployed in the cloud may interact to send and receive faxes.

To illustrate in more detail, a user associated with a receiving fax system 362 may utilize an interface provided by administrative utility 344 to register a destination on the PSTN and provide destination data associated with the registered destination on the PSTN 320. The destination on the PSTN may be, for example, a telephone number associated with receiving fax system 362. The destination data supplied by the user may include a location on the network 370, such as a URL associated with external receiver module 382.

Additionally, in some embodiments, as it may be desired to encrypt transmissions, the user may supply a public key that is part of a public/private key pair that may be used as part of a public/private key encryption mechanism (such as, for example, X.509 or the like). This public/private key pair may have been generated, for example, when fax connector 366 was installed at receiving fax system 362. The destination data can then be stored in the configuration table 348.

In one embodiment, in order to meet certain legal requirements (such as HIPAA Security Rule 164.312), or for other reasons, operators of a fax registration system may verify registered destinations on the PSTN, associated locations on the network 370 or other destination data and remove any destination on the PSTN or associated destination data that cannot be verified. This verification process may be accomplished manually or automatically, as desired.

Accordingly, as there may be many receiving fax systems, it will be noted that configuration table 348 may comprise a registered set of telephone numbers associated with a plurality of receiving fax systems, including receiving fax system 362, where each telephone number is associated with a URL and a public key. At some time interval then, sync module 308 on sending fax system 302 may send a synchronize request to fax registration service 342. Fax registration service 342 may return the registered set of telephone numbers in configuration table 348 to sync module 308 which stores these telephone numbers in fax number table 304. Thus, fax number table 304 may contain the telephone numbers of each receiving fax system 362.

In one embodiment, fax registration service 342 may encrypt the telephone numbers before responding to the synchronization request. Accordingly, in this embodiment, what is returned to sync module 308 and stored in fax number table 304 is a set of encrypted telephone numbers, such that the fax numbers stored in the fax number table 304 may not be viewed in the clear.

When a user of sending fax system 302 desires to send a fax, the fax is provided to fax module 306 along with the telephone number specifying the destination on the PSTN 320 where the user desires to send the fax. The fax may be in a digital image format such as TIFF or the portable document format (pdf) or another digital image format entirely (e.g. JPEG, Exif, RAW, PNG, CGM, SVG, etc.). When the fax module 306 receives a fax and associated telephone number the fax module may determine if the telephone number is in the fax number table 304.

In one embodiment, the fax number table 304 may comprise encrypted telephone numbers. In this case, fax module 306 may encrypt the telephone number provided by the user using the same encryption algorithm utilized by fax registration service 342, such that the determination whether the telephone number provided by the user is in the fax number table 304 can be made by searching for the encrypted telephone number in fax number table 304.

If the telephone number provided by the user is not located in fax number table 304, fax module 306 may transmit the fax to the telephone number provided by the user over the PSTN 320. If, however, it is determined that the telephone number provided by the user is in the fax number table 304, the fax and the telephone number may be provided to transmission module 310. Transmission module 310 may then send a request for destination data to the fax registration service 342, where the request specifies the telephone number provided by the user. The fax registration service 342 accesses configuration table 348 to determine the URL (and the public key if provided) associated with the telephone number received in the request and returns this destination data to the transmission module 310. In some cases, the telephone number may not be found in the configuration table 348 or no destination data may be available. In these cases an error may be returned to the transmission module 310.

If such an error is received by the transmission module 310, this error may be reported to fax module 306, which may transmit the fax to the telephone number provided by the user over the PSTN 320. Otherwise, if destination data is received, the transmission module 310 may then transmit the fax to the URL associated with that destination data. To initiate this transmission, the transmission module 310 may send a request to initiate a transmission and the telephone number to the URL specified in the destination data. The external receiver module 382 associated with the URL may respond to this request with a token to utilize for transmission associated with the fax. Furthermore, the transmission module 310 may calculate a checksum for the fax before transmission.

In one embodiment, the transmission module 310 may separate the fax into chunks for transmission. The size of these chunks may be configurable or may be determined based on a wide variety of criteria (e.g. protocol, bandwidth availability, number of faxes being sent, size of fax, etc.) and may be static or may change dynamically during the transmission. For example, the fax may be separated into chunks of 16 kb, 32 kb, 64 kb or 128 kb for transmission. Additionally, if encryption is being utilized the chunk may be encrypted using, for example, the public/private key pair associated with the public key received from fax registration module 342. A checksum can also be calculated by the transmission module for each chunk being transmitted. Transmission module 310 may then transmit each of these chunks to the URL received in the destination data over network 370.

After the transmission of each chunk of the fax, the transmission module 310 may verify the status of the transmission of that chunk. In one embodiment, when a transmitted chunk is received by internal receiver module 368, the internal receiver module may calculate the checksum for the received chunk and return the checksum to the transmission module 310. The transmission module 310 may compare the received checksum to the checksum calculated for the chunk before the chunk was transmitted to verify the transmission of that chunk. If the transmission of a chunk cannot be verified, an action may be taken. This action may include one or more retransmissions of that chunk. Alternatively, the failure of the transmission of the chunk may be reported to fax module 306, which may transmit the fax to the telephone number provided by the user over the PSTN 320.

Additionally, after the last chunk has been transmitted to the location, the transmission of the entire fax may be verified as well. This verification may be accomplished by querying external receiver module 382 at regular intervals for the status of the fax. The external receiver module 382 may return the status of the fax in response to this request. If the transmission of the entire fax cannot be verified an action may be taken. This action may include one or more retransmissions of the fax. Alternatively, the failure of the transmission of the fax may be reported to fax module 306, which may transmit the fax to the telephone number provided by the user over the PSTN 320.

At the receiving fax system 362, the chunks transmitted over network 370 may be received at the external receiver module 382 and sent through firewall 384 to internal receiver module 368. In some cases, as the external receiver module 382 resides outside the firewall, internal receiver module 368 may periodically query the external receiver module 382 and external receiver module 382 may send one or more chunks through the firewall 384 to internal receiver module 382 in response to such queries. The internal receiver module 382 may calculate a checksum for the chunk and decrypts the chunk if needed. The internal receiver module 382 may return this checksum to transmitter module 310.

The internal receiver module 368 may thus receive all the chunks associated with a fax from the transmitter module 310, construct the fax from these chunks and store the fax in received faxes storage 374. In some embodiments, before the fax is stored in received fax storage 374 the internal receiver module 368 may verify the fax. To verify the fax, internal receiver module 368 may calculate the checksum for the fax and send the checksum to transmitter module 310 with a verification request. Only when a verification response is received from transmission module 310 (which may compare the original checksum of the sent fax to the checksum received in the verification request from the internal receiver module 368) may the fax be stored in received faxes storage 374.

The fax module 364 may periodically check the received faxes 374 storage to determine if a fax has been received. If so, the fax module 364 may obtain a received fax from received faxes storage 374 and deliver the received fax in association with the destination telephone number as configured by a user. When the fax is delivered, transport and response module 372 may send a status indicating delivery of the fax to internal receiver module 368 which in turn, sends the status to external receiver module 382. This status may be provided to transmission module 310 in response to a request for status from transmission module 310. It will be noted here that though the various statuses are described as being provided in a particular manner each of these statues (or others) may be sent without prompting, may be sent in response to a request for such a status, or some combination.

As discussed above, for a variety of reasons, users of fax systems may be reluctant to deploy portions of their software or site publicly (e.g. outside of a firewall utilized at the user's site). To address these users concerns, in addition to implementing services associated with a fax registration system in a cloud based computing environment an entity implementing embodiments of the systems and method disclosed herein may implement services associated with a proxy receiver system in the cloud based computing environment.

Figure 4:
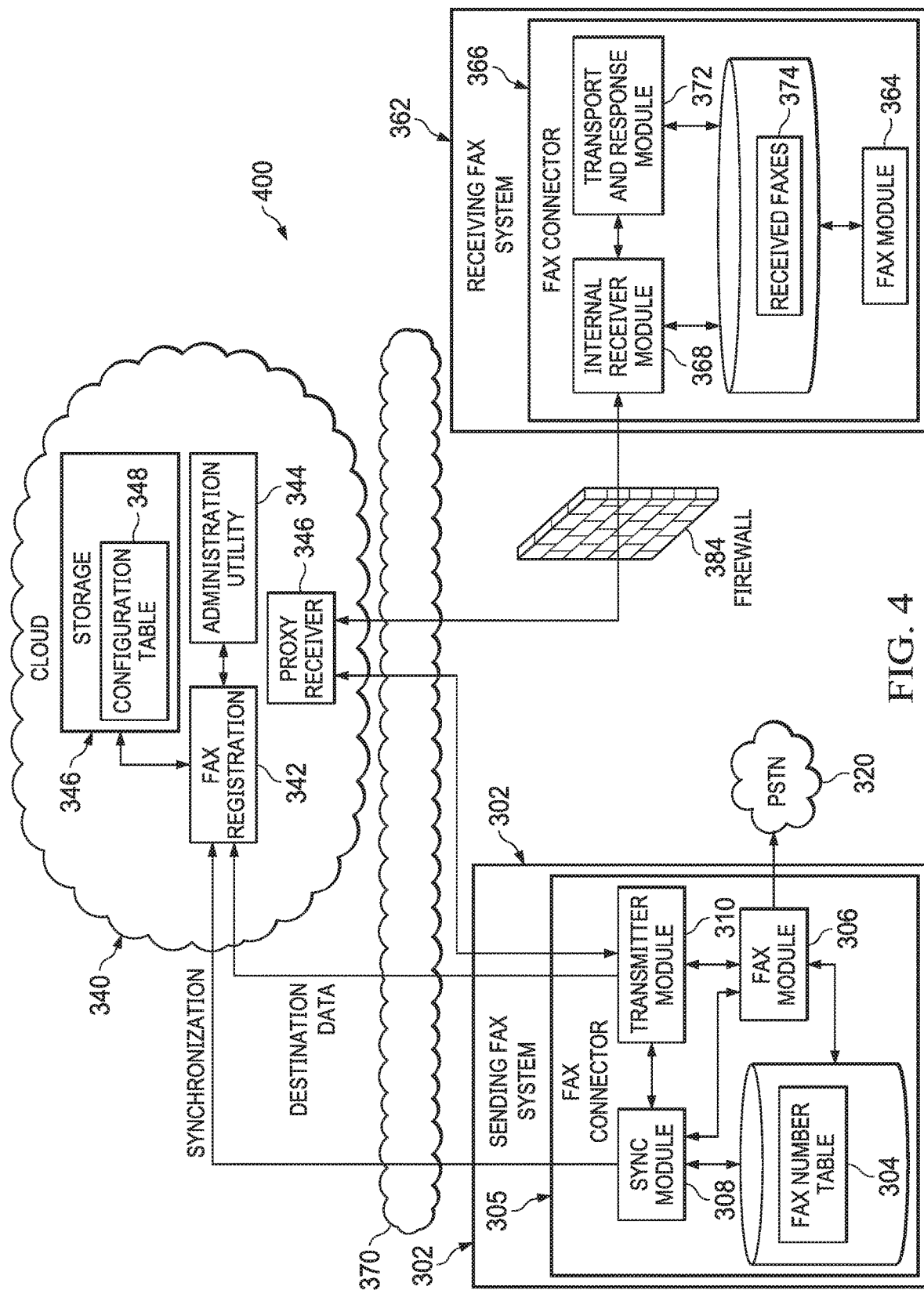
FIG. 4 depicts one embodiment of an architecture for a faxing system.

FIG. 4 depicts one embodiment of an architecture of a faxing system where services associated with both a fax registration system and a proxy receiver system are deployed in a cloud based computing environment. It will be noted that certain components as depicted in FIG. 4 function substantially the same as described above and thus will not be elaborated on here in more detail.

Here, cloud 340 includes proxy receiver module 346 configured to provide locations on the network, where each of the locations is associated with a receiving fax connector. This proxy receiver module 346 may for example, be provided by Windows Azure Service Bus or the like. Thus, proxy receiver module 346 may be configured to receive requests for faxes; receive transmissions associated with faxes; provide a transmission to an associated internal receiver module; receive a status or checksum; provide a status or checksum to a sending fax connector; receive a request for status; and provide a status to a sending fax connector.

As can be seen then, the embodiment of FIG. 4 may function similarly to FIG. 3, however, in the case of the architecture 400 of FIG. 4, the publicly accessible location on network 370 associated with fax connector 366 may be provided remotely from receiving fax system 362 and may be provided by an entity other than the entity which owns or controls receiving fax system 362. Thus, many concerns about the security of implementing fax systems according to embodiments presented herein may be mitigated using embodiments such as those depicted in FIG. 4.

Figure 5:
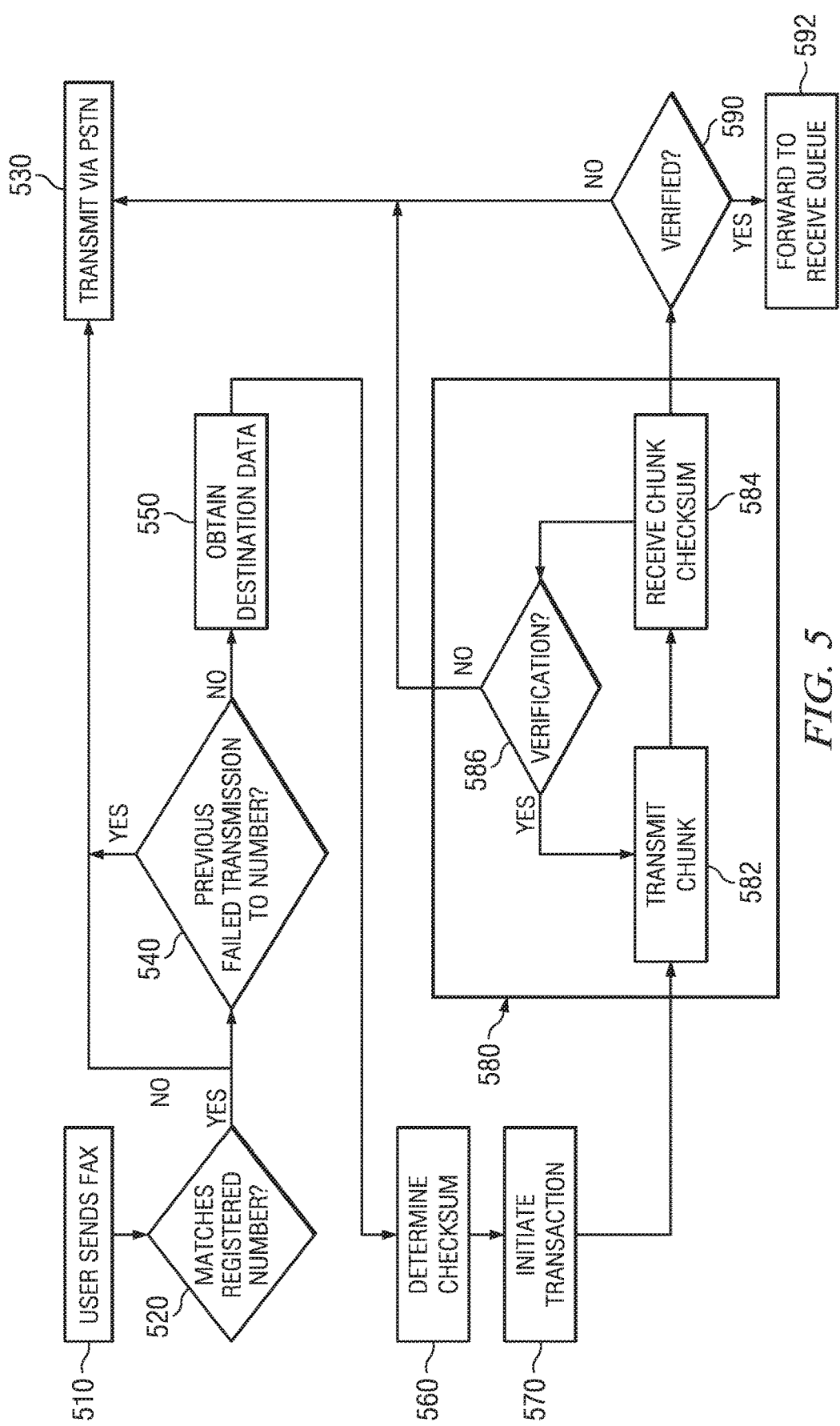
FIG. 5 depicts one embodiment of a method for sending a fax.

Moving now to FIG. 5, a flow diagram of one embodiment of a method for sending a fax that may be utilized embodiments of fax systems, including embodiments as presented herein. At step 510, a user at a sending fax system may send a fax and specify a destination telephone number for the fax. At step 520, it can be determined if the telephone number associated with the fax matches a registered number. This determination may be made by accessing a set of telephone numbers that have been registered with the system by entities which wish to receive faxes. In one embodiment, this set of telephone numbers may have been previously obtained by the sending fax system from a registration system where users who wish to receive faxes at receiving fax systems have registered telephone numbers associated with those receiving fax systems. If the telephone number specified by the user at the sending fax system in association with a fax does not match a previously registered telephone number the fax may be transmitted to the destination telephone number over the PSTN at step 530.

At step 540, it can be determined if any transmissions over a computer based network to a location associated with the destination telephone number have previously failed. This information may be recorded in association with the telephone number at the sending fax system. If over a number (e.g. one or more) transmissions to the telephone number have previously failed, the fax may be transmitted to the destination telephone number over the PSTN at step 530. It will be noted the number of failed transmission may be configurable.

Otherwise, at step 550, a location on the computer based network associated with the destination telephone number may be determined. This determination may be made by accessing a registration system to determine destination data associated with the telephone number. In one embodiment, this destination data may have been obtained from a registration system where users who wish to receive faxes at receiving fax systems have specified destination data associated with the telephone numbers for the receiving systems. This destination data may include a URL associated with the telephone number for the receiving system.

A fax checksum can be determined for the fax at step 560 and a request to initiate a fax transmission over the computer based network can be sent to the URL at step 570. The fax can then be transmitted at step 580. More specifically, the fax may be transmitted as a set of chunks. For each of the set of chunks, a chunk checksum may be calculated for the chunk at the sending fax system and the chunk may be transmitted to the URL at step 582. The transmission of the chunk can then be verified. The chunk may be received at step 584 and the chunk checksum of the received chunk determined at the receiving fax system and returned to the sending fax system. The chunk checksum received at the sending fax system can then be compared to the originally calculated chunk checksum to verify the chunk at step 586. If the chunk checksums are not the same, the fax may be transmitted to the destination telephone number over the PSTN at step 530. A failed transmission may then be recorded in association with the destination telephone number. If the chunk checksums are the same, the next chunk may be transmitted to the location at step 582.

When the last chunk of the fax is verified at step 584, the fax can then be verified at step 590. In one embodiment, the receiving fax system may construct the fax from the chunks received from the sending fax system and calculate a fax checksum for the fax. The fax checksum for the fax may be sent to the sending fax system. The sending fax system may compare this fax checksum to the fax checksum calculated for the fax by the sending fax system. If the fax checksums match the sending fax system may send a verification to the receiving fax system. If the fax checksums do not match the fax may be transmitted to the destination telephone number over the PSTN at step 530. A failed transmission may then be recorded in association with the destination telephone number. If a verification is received at the receiving fax system, the receiving fax system may place the fax on the received queue at step 592 for delivery.

As can be seen then, using embodiments of the systems and methods disclosed herein, a user can use their familiar fax environment without the restrictions of using a browser and without the need to maintain local hardware, licenses, or telephone lines. Accordingly, using embodiments of the systems and methods presented herein faxing may be achieved in a manner that is easy to use, fast, secure, reliable and cost effective and yet that is still compatible with previous methods for data exchange.

Additionally, security of fax transmissions may be increased by verifying the fax numbers and other destination data using the registration system and encrypting at least portions of the transmissions over the computer based network; traceability may be implemented through the use of a reporting features provided by embodiments of fax connectors as disclosed herein; and reliability may be achieved by utilizing the PSTN as a backup transmission mechanism.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for faxing, comprising:
a fax registration system coupled to a plurality of remote fax systems over a computer network, the fax registration system including:
a registration system table comprising destination data including a registered destination associated with a remote fax system, the registered destination data associated with a destination on a publicly switched telephone network (PSTN); and
a registration interface for obtaining destination data stored in the registration system table,
wherein each remote fax system is deployed at a location remote from the fax registration system and is adapted to:
receive destination data from the fax registration system,
store destination data in a connector table at the remote fax system,
receive a request to send a fax from a client device at the remote location, wherein the fax is associated with a first destination on a publicly switched telephone network (PSTN),
access the connector table at the remote fax system to determine if the first destination associated with the fax is registered in the connector table,
transmit the fax to the first destination over the PSTN when the first destination associated with the fax is not registered in the connector table at the remote fax system, and
when the first destination associated with the fax is registered in the connector table:
request a second destination associated with the first destination from the fax registration system through the registration interface of the fax registration system,
receive the second destination from the fax registration system, and
transmit the fax over the computer network to the second destination.

2. The system of claim 1, wherein the fax registration system is deployed in a cloud based computing environment.

3. The system of claim 1, wherein the second location is associated with a proxy receiver system.

4. The system of claim 3, wherein the proxy receiver system is deployed in a cloud based computing environment.

5. The system of claim 3, wherein at the proxy receiver system, a third location on the computer network associated with the first destination on the PSTN is determined and the fax is transmitted from the proxy receiver system to the third location over the computer network.

6. The system of claim 1, wherein the remote fax system is adapted for determining if an error occurred while transmitting the fax over the computer network to the second destination and if an error occurred, sending the fax to the first destination on the PSTN over the PSTN.

7. A method for faxing, comprising:
providing a fax registration system coupled to a plurality of remote fax systems over a computer network, the fax registration system:
providing a registration system table comprising destination data including a registered destination associated with a remote fax system, the registered destination data associated with a destination on a publicly switched telephone network (PSTN); and providing a registration interface for obtaining destination data stored in the registration system table, wherein each remote fax system is deployed at a location remote from the fax registration system and is adapted to:

receive destination data from the fax registration system, store destination data in a connector table at the remote fax system, receive a request to send a fax from a client device at the remote location, wherein the fax is associated with a first destination on a publicly switched telephone network (PSTN), access the connector table at the remote fax system to determine if the first destination associated with the fax is registered in the connector table, transmit the fax to the first destination over the PSTN when the first destination associated with the fax is not registered in the connector table at the remote fax system, and when the first destination associated with the fax is registered in the connector table:

request a second destination associated with the first destination from the fax registration system through the registration interface of the fax registration system, receive the second destination from the fax registration system, and transmit the fax over the computer network to the second destination.

8. The method of claim 7, wherein the fax registration system is deployed in a cloud based computing environment.

9. The method of claim 7, wherein the second location is associated with a proxy receiver system.

10. The method of claim 9, wherein the proxy receiver system is deployed in a cloud based computing environment.

11. The method of claim 9, wherein at the proxy receiver system, a third location on the computer network associated with the first destination on the PSTN is determined and the fax is transmitted from the proxy receiver system to the third location over the computer network.

12. The method of claim 7, wherein the remote fax system is adapted for determining if an error occurred while transmitting the fax over the computer network to the second destination and if an error occurred, sending the fax to the first destination on the PSTN over the PSTN.

13. A non-transitory computer readable medium, comprising instructions for:

at a fax registration system coupled to a plurality of remote fax systems over a computer network, the fax registration system:

providing a registration system table comprising destination data including a registered destination associated with a remote fax system, the registered destination data associated with a destination on a publicly switched telephone network (PSTN); and providing a registration interface for obtaining destination data stored in the registration system table, wherein each remote fax system is deployed at a location remote from the fax registration system and is adapted to:

receive destination data from the fax registration system, store destination data in a connector table at the remote fax system, receive a request to send a fax from a client device at the remote location, wherein the fax is associated with a first destination on a publicly switched telephone network (PSTN), access the connector table at the remote fax system to determine if the first destination associated with the fax is registered in the connector table, transmit the fax to the first destination over the PSTN when the first destination associated with the fax is not registered in the connector table at the remote fax system, and when the first destination associated with the fax is registered in the connector table:

request a second destination associated with the first destination from the fax registration system through the registration interface of the fax registration system, receive the second destination from the fax registration system, and transmit the fax over the computer network to the second destination.

14. The non-transitory computer readable medium of claim 13, wherein the fax registration system is deployed in a cloud based computing environment.

15. The non-transitory computer readable medium of claim 13, wherein the second location is associated with a proxy receiver system.

16. The non-transitory computer readable medium of claim 15, wherein the proxy receiver system is deployed in a cloud based computing environment.

17. The non-transitory computer readable medium of claim 15, wherein at the proxy receiver system, a third location on the computer network associated with the first destination on the PSTN is determined and the fax is transmitted from the proxy receiver system to the third location over the computer network.

18. The non-transitory computer readable medium of claim 13, wherein the remote fax system is adapted for determining if an error occurred while transmitting the fax over the computer network to the second destination and if an error occurred, sending the fax to the first destination on the PSTN over the PSTN.

* * * * *